United States Patent [19]

Schlesinger et al.

[11] Patent Number: 5,441,606
[45] Date of Patent: Aug. 15, 1995

[54] LIQUID PURIFYING AND VACUUM DISTILLATION PROCESS

[75] Inventors: Barry Schlesinger; Harold Rapp, both of Marina Del Rey, Calif.

[73] Assignee: FSR Patented Technologies, Ltd., Las Vegas, Nev.

[21] Appl. No.: 913,694

[22] Filed: Jul. 14, 1992

Related U.S. Application Data

[63] Continuation-in-part of Ser. No. 855,979, Mar. 23, 1992, Pat. No. 5,248,394.

[51] Int. Cl.$^6$ .......................... B01D 3/10; B01D 3/42
[52] U.S. Cl. .......................................... 203/39; 203/2; 203/3; 203/11; 203/91; 203/DIG. 17; 202/176; 202/202; 202/205; 202/206; 202/266
[58] Field of Search ............... 202/205, 160, 206, 266, 202/176, 202; 203/91, 2, 21, DIG. 8, 11, DIG. 17, 39

[56] References Cited

U.S. PATENT DOCUMENTS

| | | |
|---|---|---|
| 2,716,446 | 8/1955 | Ross ..................... 202/205 |
| 3,140,986 | 7/1964 | Hubbard . |
| 3,203,875 | 8/1965 | Sturtevant . |
| 3,236,748 | 2/1966 | Pottharst, Jr. . |
| 3,248,305 | 4/1966 | Williamson . |
| 3,324,009 | 6/1967 | Griffith et al. ............. 202/205 |
| 3,390,057 | 6/1968 | Day . |
| 3,425,235 | 2/1969 | Cox . |
| 3,440,147 | 4/1969 | Rannenberg . |
| 3,489,652 | 1/1970 | Williamson . |
| 3,522,152 | 7/1970 | Osdor ..................... 203/11 |
| 3,597,328 | 8/1971 | Michels . |
| 4,170,522 | 10/1979 | Buggele ..................... 202/205 |
| 4,248,672 | 2/1981 | Smith . |
| 4,267,022 | 5/1981 | Pitcher . |
| 4,269,664 | 5/1981 | Younger . |
| 4,282,070 | 8/1981 | Egosi . |
| 4,285,776 | 8/1981 | Atwell . |
| 4,292,121 | 9/1981 | Caffes ..................... 203/24 |
| 4,366,030 | 12/1982 | Anderson ............. 202/205 |
| 4,525,243 | 6/1985 | Miller . |
| 4,555,307 | 11/1985 | Hagen . |
| 4,561,940 | 12/1985 | Meier ..................... 202/205 |
| 4,585,524 | 4/1986 | Hoiss . |
| 4,595,460 | 6/1986 | Hurt . |
| 4,613,412 | 9/1986 | MacDermid ............. 202/205 |
| 4,686,009 | 8/1987 | McCabe .................... 203/91 |
| 4,696,718 | 9/1987 | Lasater . |
| 4,749,447 | 6/1988 | Lew ..................... 202/205 |
| 4,759,825 | 7/1988 | Medvey et al. ............. 202/205 |
| 4,770,748 | 9/1988 | Cellini . |
| 4,954,223 | 9/1990 | Leary et al. . |
| 4,985,122 | 1/1991 | Spencer ..................... 202/205 |
| 5,064,505 | 11/1991 | Borgren ..................... 202/205 |
| 5,162,081 | 11/1992 | Bowes ..................... 203/2 |

FOREIGN PATENT DOCUMENTS

| | | |
|---|---|---|
| 664466 | 6/1963 | Canada ..................... 202/205 |
| 829487 | 4/1938 | France . |
| 2505968 | 8/1976 | Germany . |
| 3345937 | 7/1985 | Germany ..................... 202/205 |
| 549820 | 12/1942 | United Kingdom ............. 202/205 |
| 8102154 | 8/1981 | WIPO ..................... 202/205 |

OTHER PUBLICATIONS

S-200 Vapor Compression Water Processor produced by Superstill Technology, Inc., Inventor Stephan Sears, 4 pages.

Primary Examiner—Wilbur Bascomb, Jr.
Attorney, Agent, or Firm—Ladas & Parry

[57] ABSTRACT

This invention involves a distillation process for operating a distillation purifying system. The system includes a section which creates a vacuum pressure that is transmitted throughout the system, a distillation/purification zone in which fluids to be distilled/purified are treated, and a collection zone in which the distilled/purified liquids are transferred. The distillation purifying process and system are effective for certain liquids, solutions, and the like and can be used for water treatment, petroleum processes, and bodily fluid treatment.

12 Claims, 3 Drawing Sheets

LIQUID PURIFYING AND VACUUM DISTILLATION PROCESS

CROSS REFERENCE TO RELATED APPLICATION

This is a continuation in part of U.S. Ser. No. 07/855,979 filed on Mar. 23, 1998, now U.S. Pat. No. 5,248,394 and incorporated herein by reference. This invention is reflected at least in part in U.S. Disclosure Document No. 301003 received by the U.S. Patent Office on Feb. 10, 1992 and incorporated herein by reference.

BACKGROUND OF THE INVENTION

There is a recognized need to convert undrinkable water to potable water and to have the ability to cleanse liquids in general. Many inventions have been created to attend to this need. A list of such inventions includes the following.

U.S. Pat. No. 5,064,505 (Borgten)
U.S. Pat. No. 4,770,748 (Cellini)
U.S. Pat. No. 4,954,223 (Leary)
U.S. Pat. No. 4,696,718 (Lasater)
U.S. Pat. No. 4,525,243 (Miller)
U.S. Pat. No. 4,585,524 (Hoiss)
U.S. Pat. No. 4,595,460 (Hurt)
U.S. Pat. No. 4,248,672 (Smith)
U.S. Pat. No. 4,267,022 (Pitcher)
U.S. Pat. No. 4,269,664 (Younger)
U.S. Pat. No. 4,282,070 (Egosi)
U.S. Pat. No. 3,597,328 (Michels)
U.S. Pat. No. 3,489,652 (Williamson)
U.S. Pat. No. 3,425,235 (Cox)
U.S. Pat. No. 3,440,147 (Rannenberg)
U.S. Pat. No. 3,236,748 (Pottharst, Jr.)
U.S. Pat. No. 3,203,875 (Sturtevant)
U.S. Pat. No. 4,555,307 (Hagen)
U.S. Pat. No. 4,686,009 (McCabe)
U.S. Pat. No. 4,285,776 (Atwell)
U.S. Pat. No. 4,366,030 (Anderson)
U.S. Pat. No. 3,248,305 (Williamson)
U.S. Pat. No. 3,390,057 (Day)
U.S. Pat. No. 3,140,986 (Hubbard)
The S-200 Vapor Compression Water Processor ™ produced by Superstill Technology Inc.
U.S. Congress, Office of Technology Assessment, "Using Desalination Technologies for Water Treatment", OTA-BP-O-46 (Washington, DC: U.S. Government Printing Office, March 1988).

Unfortunately, many of these inventions are unduly complex, ungainly, uneconomical, unworkable, and/or not as efficient or as effective as they might be. The present invention attempts to overcome these drawbacks and to disclose an advance to the art. The present invention is essentially a closed loop system recycling heat, energy, and fluid.

BACKGROUND OF THE INVENTION

The purpose of the first embodiment of this invention is to convert salt water, brackish water, contaminated ground water, or contaminated water from large bodies of water to potable quality water which can be used for irrigation, human and animal consumption, or industrial or manufacturing needs. The device employs a vacuum distillation process which is believed to remove virtually all dissolved solids, particulates, bacteria, and organic matter from contaminated water. The device is environmentally desirable in that it does not concentrate brine residues or discharge high temperature water. While the following description directs itself to the cleansing of water, the cleansing of other liquids or fluids is also contemplated.

The purpose of the second embodiment of this invention is to separate certain specific fluids in solution and to separate certain fluids from contaminants and solids, such as salts and bacteria. The second embodiment is directly applicable to the separation of water from ethylene glycol solutions (aircraft de-icing solutions), and to the separation and vapor distillation of certain fluids, including but not limited to the separation of fluids for medical purposes and petroleum processes. The second embodiment of this invention offers great versatility through the use of a computer controlled system which allows the separation and purification of various fluids or liquids based upon their vaporization points under vacuum conditions. The device removes unwanted liquids such as water, from solutions to enable the economical transport of the remainder of the solution. It also enables one to separate a specific fluid, such as glycol, from a solution. For the purpose of explanation only, the removal of water from a solution of ethylene glycol and water is primarily discussed herein.

The purpose of the third embodiment is to cleanse liquids with a device which utilizes heat recovery and can be lower in profile than the device described in the first embodiment. This third embodiment is used for the same purposes as the device described in the first embodiment, and in certain installations will be preferred where there is not abundant heat sources from outside processes available, and where a device of smaller proportion is required.

All embodiments make use of unshown sensor means and computers which sense and activate portions of the invention. These are well known to those skilled in the art. All embodiments operate on various liquids and fluids and are not limited to the examples disclosed herein.

SUMMARY OF THE INVENTION

Disclosed herein is a distillation/purifying system comprised of:
a vacuum means;
a distillation/purifying means in fluid communication with said vacuum means; and
a collection area in fluid communication with said vacuum means and said distillation/purifying means, said distillation purifying means communicating distilled/purified fluid to said collection area and comprising a trap through which said distilled/purified fluid flows to said collection area.

Also disclosed herein is a distillation/purifying system comprised of:
a vacuum means;
a distillation/purifying means having heating means therein, said distillation/purifying means being in fluid communication with said vacuum means; and
a collection area in fluid communication with said vacuum means and said distillation/purifying means, said distillation purifying means communicating distilled/purified fluid to said collection area and while separating and disposing of the fluids in which said distilled purified fluid was mixed, said heating means being activated for use in said distillation/purifying means only after said computer control system ensures that the vacuum level in said system corresponds to a latent heat of vaporization point which represents a set relationship with respect to the temperature of the fluid to be distilled/purified.

IN THE DRAWINGS

DETAILED DESCRIPTION OF THE INVENTION

Figure 1:
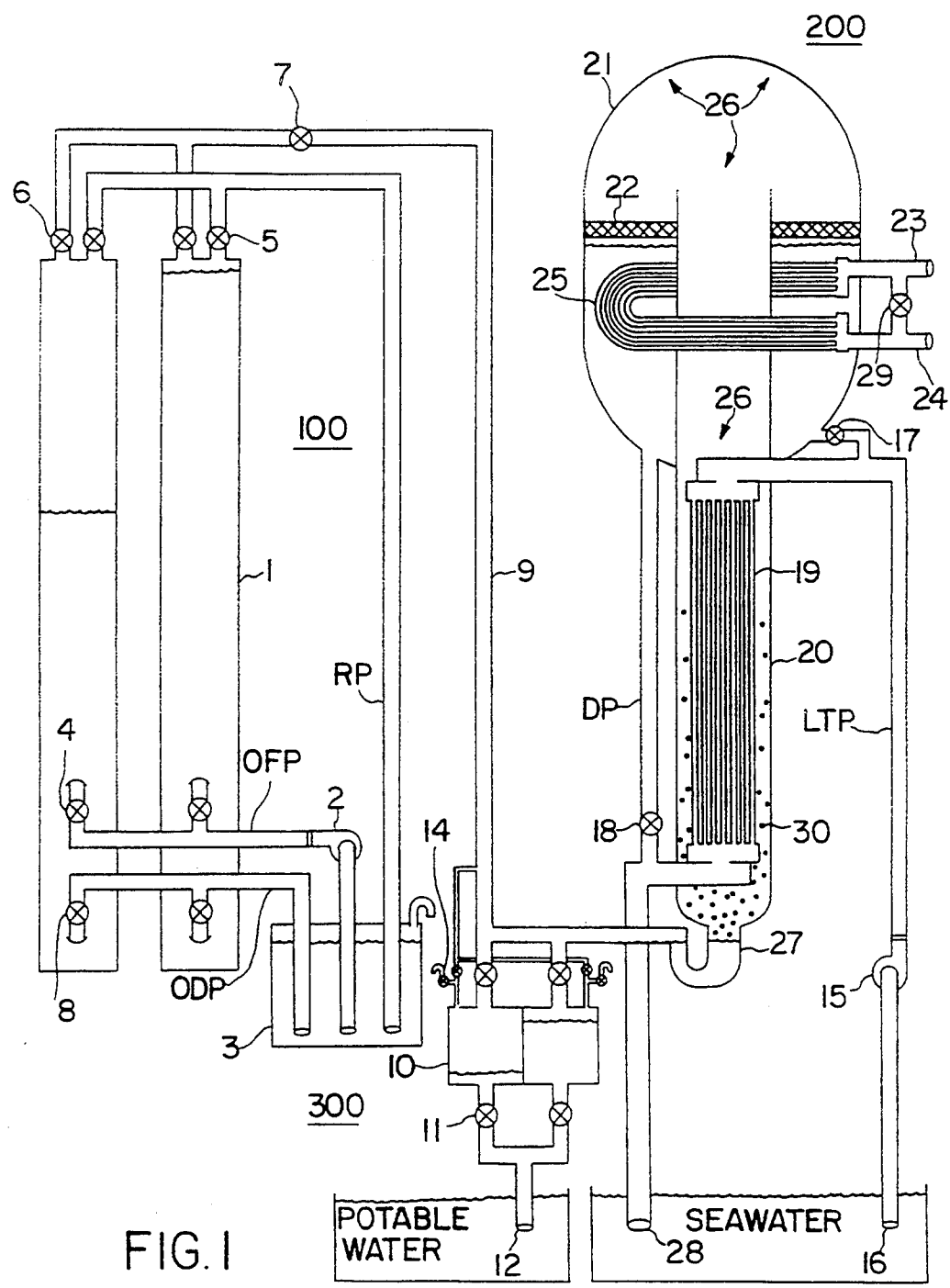
FIG. 1 is a diagrammatic view of a first embodiment of the invention.

The present invention as first disclosed in FIG. 1, may be broadly broken Into three areas of study. These are the Vacuum Generating Section (100), the Liquid Cleansing Area (200), and the End Collection Zone (300).

Vacuum Generating Section (100)

In FIG. 1, the Vacuum Generating Section (100) is defined by reference numerals (1) through (9). Two oil-filled towers (1) used to create a vacuum, are situated side by side and connected in parallel as further described herein. More than two oil-filled towers (1) can be included. The oil-filled towers (1) are preferably 35 to 50 feet in height and preferably 6 to 14 inches in diameter. Greater diameters are, however, within the contemplation of this invention. The oil-filled towers (1) are filled with a synthetic oil (polyalphaolefin) or other similar liquid exhibiting similar physical characteristics. The oil-filled towers (1) chosen for use are preferably made of steel pipe or similar material that is: a) capable of sustaining the vacuum levels that are generated within each tower, and b) able to function as structural support for the insulated evaporator chamber (21) and insulated vapor condensing tower (20) discussed with respect to the Liquid Cleansing Area (200).

Extending from the lower portion of each oil-filled tower (1) are two pipes, an oil feeder pipe (OFP) and an oil drain pipe (ODP). The oil drain pipe (ODP) is situated below the oil feeder pipe (OFP). Extending from the top of each oil-filled tower(1) are also two pipes, a return pipe (RP) and a vacuum pipe (9). The oil feeder pipe (OFP), the oil drain pipe (ODP), and the return pipe (RP) all extend into an atmospherically vented oil tank (3) situated near the bases of oil-filled towers (1). Through these pipes, oil is drained into and pumped from vented oil tank (3). Oil pump (2) is attached to oil feeder pipe (OFP) to facilitate the pumping of oil from vented oil tank (3) to oil-filled towers (1). Oil pump (2) could be instead a submersible pump situated within vented oil tank (3). Since oil feeder pipe (OFP) attaches to both oil-filled towers (1), it has two first ends. Each first end is connected to the lower portion of each oil-filled tower (1) by oil fill valves (4). Oil feeder pipe (OFP) has also a second end which end extends within vented oil tank (3). Oil pump (2) is located between the first ends and the second end of oil feeder pipe (OFP) and above and outside of vented oil tank (3).

Oil pump (2) is used to transfer the oil from the vented oil tank (3) to the oil-filled towers (1) until a level sensor within each oil tank (not shown) indicates that an oil-filled tower (1) is filled completely with oil. When one of the tower sensors indicates that its respective oil-filled tower (1) is filled, an automated tower vent valve (5), located at the top of each oil-filled tower (1) and connected to return pipe (RP), allows excess oil to flow through return pipe (RP) to vented oil tank (3).

Below each tower oil fill valve (4) on each oil-filled tower (1) is a tower oil drain valve (8). Tower oil drain valve (8) is connected to oil drain pipe (ODP) and enables oil to drain by means of gravity from each oil-filled tower (1) through oil drain pipe (ODP) back into vented oil tank (3).

At the top of each oil-filled tower (1) and near tower vent valve (5), is tower vacuum valve (6) connecting oil-filled tower (1) to vacuum piping (9). Tower vent valve (5), tower vacuum valve (6), tower oil fill valve (4), and tower oil drain valve (8) are automated control valves. They and the level sensor in each tower (1), regulate the activity of oil-filled towers (1) such that tower oil valve (8) at the bottom of the oil-filled tower (1) opens to allow oil to drain to the vented oil tank (3) while valves (4) (5) (6) are closed. This draining of oil creates a substantial vacuum within oil-filled tower (1). This vacuum is transmitted to the rest of the system when tower vacuum valve (6) opens and allows the vacuum to be transmitted through vacuum regulating valve (7) and vacuum piping (9). Vacuum regulating valve (7) is located in vacuum piping (9) to regulate the flow of vacuum through vacuum piping (9). The oil inside oil-filled towers (1) does not vaporize under the extreme vacuum conditions because the oil is at ambient temperature. The vacuum regulating valve (7) has a capillary bleed-off (not shown) to control the vacuum level transmitted through vacuum piping (9) to the rest of the system at the level specified by a computer control system associated with the system of FIG. 1. Such computer control systems are well known to those skilled in the art.

In use, oil-filled towers (1) alternately fill with oil and drain. In towers 42 to 50 feet in height, the towers may drain to approximately the 35 foot level. The level corresponds to the effect of one atmosphere. This alternating action results in a continuous vacuum being supplied to the system through vacuum regulating valve (7) and vacuum piping (9). Oil pump (2) is cycled on and off by the computer as required to fill oil-filled towers (1).

The interrelationship of oil-filled towers (1) in their draining and filling of oil can be likened to the actions of pistons in an engine. Vacuum Generating Section (100) could be replaced by other known vacuum devices, but preferably a water seal vacuum pump with air ejectors.

Liquid Cleansing Area (200)

The Liquid Cleansing Area (200) is seen in FIG. 1 as composed of reference numerals (15) through (29). At the heart of this area is insulated evaporator chamber (21) which is somewhat rounded in shape although its height is greater than its width. Insulated evaporator chamber (21) is connected to insulated vapor condensing tower (20) which is tubular in shape and has a diameter that is less than that of Insulated evaporator chamber (21). Insulated evaporator chamber (21) and insulated vapor condensing tower (20) as combined, are preferably 42 to 50 feet in overall height. Insulated vapor condensing tower (20) itself can vary in height. Insulated evaporator chamber (21) is preferably 8 to 15 feet in height. Depending upon end goals, these heights may differ significantly as would be appreciated by those skilled in the art.

Insulated vapor condensing tower (20) extends into insulated evaporator chamber (21) and has an open end that is spaced from the top inside portion of insulated evaporator chamber (21). The base of insulated vapor condensing tower (20) opens into insulated distillate water trap (27) such that it is in fluid communication therewith. Insulated distillate water trap (27) is a U in shape with the leg of the U which connects to the base of insulated vapor condensing tower (20) being wider than its opposing leg and base. Insulated distillate water trap (27) is a typical trap that is readily available in the market. Its opposing leg connects to and is integral with vacuum piping (9) so that the vacuum pressure created in Vacuum Generating Section (100) is communicated to Liquid Cleansing Area (200) through vacuum piping (9) and insulated distillate water trap (27). The vacuum is transmitted through insulated distillate water trap (27) to insulated vapor condensing tower (20) in vapor expansion area (26). Vapor expansion area (26) is the longitudinal extension of insulated evaporator chamber (21) within insulated vapor condensing tower (20) and the upper half of insulated evaporator chamber (21).

Extending within insulated vapor condensing tower (20) is open tube bundle heat exchanger (19) comprised of heat exchanger tubes. The top end of open tube bundle heat exchanger (19) is connected to a liquid transfer pipe (LTP). Liquid transfer pipe (LTP) initially extends transversely from and into insulated vapor condensing tower (20) and below the base of insulated evaporator chamber (21). It then angles downwardly generally parallel to insulated vapor condensing tower (20) to interconnect with seawater supply pump and filter strainer (15) and descend into the liquid (16) that is to be purified. This liquid (16) may be seawater or other contaminated water. It is usually at 50 to 70 degrees fahrenheit, although hotter or colder temperatures are within the operating ranges of the device. Seawater supply pump and filter strainer (15) pumps this liquid through liquid transfer piping (LTP) to open tube bundle heat exchanger (19).

Seawater and brine discharge piping (28) is connected to the bottom end of open tube bundle heat exchanger (19). It extends transversely from within insulated vapor condensing tower (20) to the outside of condenser tower (20) and then angles downwardly to empty into the body of liquid, such as seawater (16). In use, liquid (16) passes by means of pump (15) into liquid transfer pipe (LTP) and to open tube bundle heat exchanger (19). Here, the liquid enters open tube bundle heat exchanger (19) and flows through the heat exchanger tubes, absorbing heat from the water vapors which surround the outside of the tubes as discussed below. The liquid which has passed through the open tube bundle heat exchanger (19), is then discharged through seawater and brine discharge piping (28) back to its area of origin, only slightly warmer than the temperature at which it was originally supplied by seawater supply pump and filter strainer (15). The water that is returned to (16) through discharge piping (28) is usually not more than 5 to 10 degrees warmer than when it was originally supplied.

Thus just as the oil from vented oil tank (3) is carried in a full circle from vented oil tank (3) back to vented oil tank (3), so is the liquid from point (16) carried from its point of origin and back.

Extending from the portion of liquid transfer pipe (LTP) which is situated transverse to the longitudinal axis of insulated vapor condensing tower (20) and lies outside thereof, is a branch pipe of smaller diameter than that of the liquid transfer pipe (LTP). This smaller branch pipe extends generally parallel to the upper portion of the liquid transfer pipe (LTP) and into the base of insulated evaporator chamber (21). A make-up water regulating valve (17) affects the communication between the branch pipe and the liquid transfer pipe (LTP). When the make-up water regulating valve (17) is open, the liquid passing through liquid transfer pipe (LTP) enters the insulated evaporator chamber (21) through make-up water regulating valve (17). This design and the opening and closing of make-up water regulating valve (17) enable the system to maintain the proper water level inside insulated evaporator chamber (21). That level is a level Just below demister pad(s) (22) and covering open tube bundle heat exchanger (25) both of which are discussed below. In certain installations in which the entering liquid such as seawater (16) has a high concentration of oxygen and gasses, a degassification chamber, such as described in the second embodiment herein, would be added between make-up water regulating valve (17) and insulated evaporator chamber (21). This degassification chamber enables the removal of a majority of these gasses from the liquid.

Extending within insulated evaporator chamber (21), around its inside sides and in its lower half, is an open tube bundle heat exchanger (25). This open tube bundle heat exchanger (25) heats the seawater contained in the lower half of insulated evaporator chamber (21). The top half of insulated vapor condensing tower (20) is surrounded by open tube bundle heat exchanger (25). As seen in FIG. 1, open tube bundle heat exchanger (25) is fed by heating source supply piping (23) that extends outside of insulated evaporator chamber (21). Through supply piping (23) is passed a heated medium which then enters open bundle heat exchanger (25). The medium then exits from open bundle heat exchanger (25) by means of heating source return piping (24) which extends from open bundle heat exchanger (25) to outside of insulated evaporator changer (21). Situated between and communicating with both heating source supply piping (23) and heating source return piping (24) is flow regulating/bypass valve (29) which enables communication between both sections if desired. Operation of a heat exchanger such as shown at (23), (24), (25), and (29) is well known in the art.

There are different configurations of heat exchangers that can perform the same function as that just described with respect to open tube bundle heat exchanger (25). Further, the location of the heat exchanger inside insulated evaporator chamber (21) can be varied from U-shaped to circular although in all instances the heat exchanger must heat the liquid in the lower half of insulated evaporator chamber (21). It must not however, be inside the chamber nor must it follow the inside configuration of the insulated evaporator chamber (21). For instance, it may be wrapped around the lower outside half of the evaporator chamber (21). It must be located only to heat the liquid below the demister pad (22) that is discussed below. Sources of heat for open tube bundle heat exchanger (25) are well known In the art, but some examples of these are now listed.

a. 80 to 100 degree fahrenheit cooling tower water from industrial -process or a commercial HVAC system.
    b. Heat reclaimed from an internal combustion engine coolant and exhaust manifold.
    c. Low pressure steam.
    d. Solar, geothermal, or other free heat.

e. Hot water or steam discharge(s) from utility or electrical generating plants.

Extending parallel to and above open tube bundle heat exchanger (25) and generally centrally of insulated evaporator chamber (21), is a demister or demister pads (22). This pad extends fully across the inside diameter of insulated evaporator chamber (21) creating a layer that is interrupted only by the top of insulated vapor condensing tower (20) which passes through demister pad or demister pads (22). The demister pad is vapor permeable and corresponds in shape to that of insulated evaporator chamber in horizontal cross section. Thus the diameter and circumference of demister pad or the combination of demister pads (22) is generally equal to that of the inside central area of insulated evaporator chamber (21). Demister pad or demister pads (22) may be made of separation mesh or similar materials, stainless steel or PVC or other material generally impervious to corrosion.

The liquid such as seawater which enters insulated evaporator chamber (21) by means of the branch pipe and make-up water regulating valve (17), is heated to approximately 10 degrees fahrenheit above its original temperature by the heat source flowing through open tube bundle heat exchanger (25). (Prior to introducing a heat source into open tube bundle heat exchanger (25) within insulated evaporator chamber (21), a computer control system ensures that certain conditions are met. These are that insulated evaporator chamber (21) is filled with seawater from (16) to a correct water level, and that the system vacuum level is established through vacuum piping (9) to insulated evaporator chamber (21) at latent heat of vaporization point under vacuum conditions which corresponds to a set relationship with respect to the temperature of the seawater within insulated evaporator chamber (21). Introduction of heat to the open tube bundle heat exchanger (25) may then begin.)

Since insulated evaporator chamber (21) is under vacuum pressure (due to its ultimate connection to vacuum piping (9) by way of insulated vapor condensing tower (20) and insulated distillate water trap (27)), vigorous vaporization of the liquid, likely seawater, contained in insulated evaporator chamber (21) occurs as the liquid warms. As this vaporization occurs, demister or demister pads (22) serves to limit any carryover of particles such as salt when seawater is involved, into the resulting vapor stream. As the liquid, here presumably seawater, vaporizes, salts and other contaminants are separated and settle toward the bottom of insulated evaporator chamber (21). The vapor meanwhile passes through the demister or demister pads (22) and ultimately into vapor expansion area (26).

Extending outside of and from the base of insulated evaporator chamber (21) is discharge pipe (DP). Discharge pipe (DP) is situated generally parallel to and alongside of insulated vapor condensing tower (20). Discharge pipe (DP) is connected by means of brine discharge regulating valve (18) to seawater and brine discharge piping (28). This connection allows the concentrated residue such as salts resulting from the vaporization in the Insulated evaporator chamber (21) to be discharged from the base insulated evaporator chamber (21) through discharge pipe (DP) into brine discharge piping (28) and emptied with the fluid from open tube bundle heat exchanger (19) into the main source of liquid such as seawater (16). Alternately, the discharge at (28) may be used with known hydraulic recovery technology (not shown) to reduce pumping requirements or electrical power requirements. This is accomplished by utilizing the power from the discharge at (28) prior to allowing the liquid and residue to return to (16). The discharge at brine discharge regulating valve (18) can also be diverted separately from brine discharge piping (28) to allow collection of contaminants and salts in a suitable container or evaporation pond.

Returning to the vaporization in the insulated evaporator chamber (21), as the seawater or other liquid vaporizes and passes through the demister or demister pads (22), the vapors expand in the insulated evaporator chamber (21). Here they are pulled into insulated vapor condensing tower (20) through vapor expansion area (26). This is due to the vacuum which is transmitted from vacuum piping (9) through insulated distillate water trap (27). The vapors condense on the cooler open tube bundle heat exchanger tubes (19) and then fall as droplets (30) and collect in insulated distillate water trap (27) located at the base of insulated vapor condensing tower (20). As soon as insulated distillate water trap (27) fills completely with liquid, a pressure differential develops between the vapor in insulated evaporator chamber (21) and the vacuum in vacuum piping (9). This pressure differential causes the liquid in insulated distillate water trap (27) to flow in the piping to the insulated distillate water collection tanks (10). These tanks are discussed in greater detail with respect to End Collection Zone (300). The trap feature is unique in that once the insulated distillate water trap (27) is filled with liquid, the vacuum requirement for the system diminishes. As the liquid exits the trap (27), it does not simply revaporize because the vacuum level from vacuum piping (9) is computer controlled to a latent heat of vaporization point under vacuum pressure which corresponds to a temperature greater than the temperature of the water condensing in the insulated distillate water trap (27).

End Collection Zone (300)

End Collection Zone (300) is composed of reference numerals (10) through (14) in FIG. 1.

Located below the joinder of vacuum piping (9) and insulated distillate water trap (27) are at least two insulated and closed distillate water collection tanks (10). Each insulated distillate water collection tank (10) has on its topmost portion a water Inlet control valve (13) which connects it via a pipe to vacuum piping (9). At the opposite, bottom end of each insulated distillate water collection tank (10) is a collection tank drain valve (11) which connects each insulated water collection tank (10) to a pipe which empties the distilled liquid from insulated water collection tanks (10) into a desired location for potable water. Vent and vacuum control valves (14) are connected to the tops of insulated distillate water tanks (10) and in part to each other. They vent each insulated distillate water collection tank (10) to atmosphere or seal the insulated distillate water collection tanks (10) within the vacuum system.

In use, the water from insulated distillate water trap (27) flows toward the two or more insulated distillate water collection tanks (10) due to the vacuum pressure transmitted through vacuum piping (9). The insulated distillate water collection tanks (10) are exposed to the vacuum pressure in vacuum piping (9) when water inlet valve (13) is open and collection tank drain valve (11) and vacuum and vent control valves (14) are closed. The water collection tanks are at the same vacuum level as the vacuum transmitted through vacuum piping (9). Thus with water inlet Control valve (13) open, the distilled water flowing from the insulated distillate water trap (27) flows into the first insulated distillate water collection tank (10), filling it with water. When the first insulated distillate water collection tank (10) is filled, water inlet control valve (13) for that insulated distillate water collection tank (10) closes and collection tank drain valve (11) for that insulated distillate water collection tank (10) opens. The vent control valve at (14) for that insulated distillate water collection tank (10) also opens at that time so that the water inside the insulated distillate water collection tank (10) will drain into the potable water discharge piping (12). As soon as the insulated distillate water collection tank (10) just drained is empty of water, vent control valve at (14) closes, water inlet control valve (13) remains closed, collection tank drain valve (11) closes, and vacuum control valve at (14) opens to evacuate all air from the insulated distillate water collection tank (10). Vacuum valve at (14) closes as soon as the tank is evacuated of such air, and water inlet control valve (13) is reopened to receive once again the distilled water from insulated distillate water trap (27), Known sensors controlled by a computer system are used in End Collection Zone (300) to facilitate the appropriate opening and closing of the valves.

The insulated distillate water collection tanks (10) alternately drain and fill with water so that a continuous flow of water from water trap (27) to one of tanks (10) occurs. The insulated distillate water collection tanks (10) are insulated to isolate them from ambient temperatures, and the piping from the insulated distillate water trap (27) to the insulated distillate water collection tanks (10) is also insulated.

The elements described in End Collection Zone (300) could be replaced by a known rotating vane device or a peristaltic pump and tank assembly. This is true with respect to the End Collection Zone (300) in all embodiments.

Vacuum level inside the invention is computer maintained to correspond to a temperature for vaporization of liquid under vacuum that is warmer than the incoming liquid being supplied to the invention. This vacuum and temperature relationship serve to allow the cooler distillate liquid to not simply revaporize when it exits trap (27). Further, trap (27) and its collection tanks are insulated to avoid ambient temperatures from affecting the process, and the venting and draining of the collection tanks are such that they do not diminish the vacuum levels inside the desalination device.

This invention can operate at a broad range of incoming liquid temperatures and vacuum levels, but one example would be 60 degrees fahrenheit incoming seawater to the device with a system vacuum level initially established at 29.25 inches Hg, approximately 70 degrees fahrenheit temperature of heated water in chamber (21), and water collecting at trap (27) at 60 to 61 degrees fahrenheit. The test is that the incoming heat source at (23) must be adequate to elevate the temperature of liquid in boiler chamber (21) so the liquid will vaporize under vacuum conditions.

The liquid is able to fill and drain from evaporator (21) under vacuum conditions because of the height of the tower (20) and evaporator chamber (21) above the barometric level of one atmosphere (approximately 33 feet). As the brine concentrates are allowed to exit through valve (18), computer controlled water regulating valves maintain the proper liquid level in the device by opening and closing slightly when level sensors in the evaporator chamber (21) indicate there is a need for liquid to be added.

As stated above, evaporator chamber (21) is provided with vacuum transmitted through the vapor collection pipes, and the heating elements within insulated evaporator chamber (21) are thermostatically controlled to elevate the liquid within insulated evaporator chamber (21) approximately 10 degrees fahrenheit above the incoming liquid temperature. At ,vacuum levels of operation, approximately 1100 btu/lb-m is required to vaporize water within the evaporator chamber (21). If the incoming feed water is 60 degrees fahrenheit, the boiler chamber will be typically at 70 degrees fahrenheit and the vacuum level will typically be set for 29.25 inches Hg.

The relationship and interconnection of vacuum generating section (100) to cleansing area (200) are of particular interest in that the manner in which cleansing section (200) operates to condense vapors and utilize trap (27) effectively stops substantially any moisture vapor migration and accumulation of such moisture in oil-filled towers (1). This feature is significant and has not been addressed in other similar inventions using oil-filled towers to create vacuum.

This device recovers low levels of processed heat normally discarded in other systems. It reuses this heat for the process of creating clean liquid from contaminated liquid. The device purifies and distills a contaminated liquid (such as seawater to potable water) and in doing so removes heat from an outside source processed liquid and feeds it into the system. Here this is through open tube bundle heat exchanger (25) which then returns the outside source processed liquid at a lower temperature for reuse in the external system. Prior art inventions do not make use of low level processed heat from outside sources. Thus the present invention replaces or supplements the function of the cooling tower or its equivalent since it recovers at least a preponderance of the heat of rejection. This latter aspect is not captured by other inventions known to the inventor.

This device and process am expandable modularly such that more than one device are served by the same set of vacuum towers or heat sources and pumping sources. The attached drawings, which are not to scale, represent only the schematic relational flow of the process. There are different configurations for the condenser tower, boiler chamber, and vapor collection piping. The vacuum towers, boiler chamber and condenser tower can be partially located below ground level to minimize height problems. Heat for the process can be supplied from a number of different sources including solar, geothermal, steam, hot water, or internal combustion engine. As an example, the invention could be located adjacent an oceanside nuclear power generating facility and make use of the cooling water which is usually returned to the ocean at substantially elevated temperatures.

Figure 2:
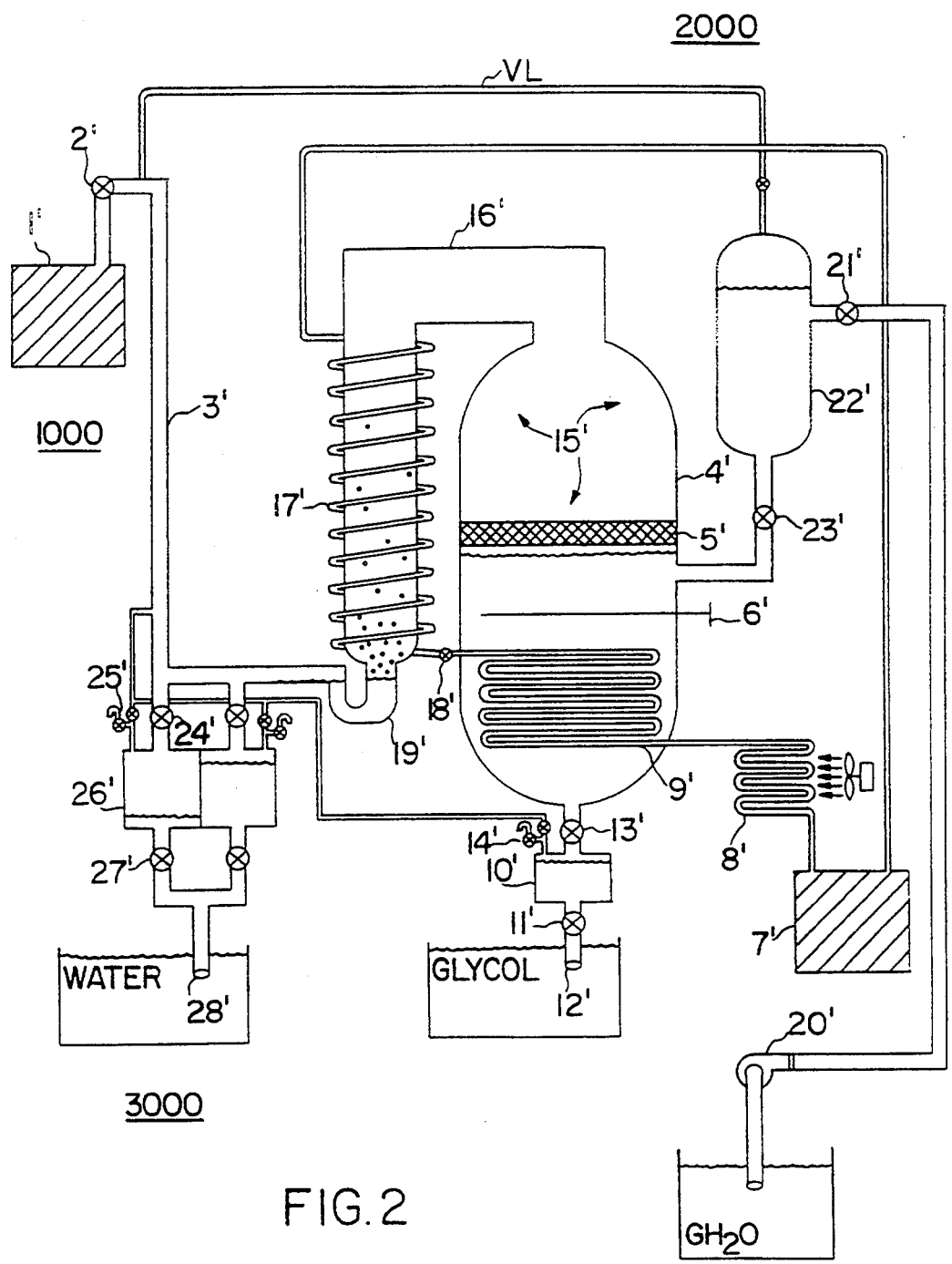
FIG. 2 is a diagrammatic view of a second embodiment of the invention.

Turning now to FIG. 2 and the second embodiment of this invention a liquid purifying/distilling invention is disclosed.

FIG. 2, may be divided again into three major areas: a Vacuum Generating Section (1000); a Liquid Cleansing Area (2000); and an End Collection Zone (3000).

Vacuum Generating Section (1000)

This first area is composed of reference numerals (1') through (3') in FIG. 2. As in FIG. 1, vacuum pressure is used throughout the system. In this embodiment, the vacuum pressure is created by the use of a water seal vacuum pump equipped with air ejectors (1') and self contained cooling feature. This water seal vacuum pump with air ejectors (1') transmits vacuum through vacuum regulating valve (2') located above water seal vacuum pump with air ejectors (1') and connected thereto by vacuum piping (3'). When vacuum regulating valve (2') is open, the vacuum pressure created by water seal vacuum pump with air ejectors (1') is transmitted throughout vacuum piping (3') and the entire system of the second embodiment of this invention as seen in FIG. 2.

The vacuum regulating valve (2') has a capillary bleed-off to control the vacuum level transmitted through vacuum piping (3') to the rest of the system at the level specified by a computer control system known to those skilled in the art. On larger applications of this invention, this section can be substituted in its entirety by the Vacuum Generating Section (100) described in FIG. 1 which utilizes oil-filled towers to produce the same vacuum effect. In certain smaller applications, a standard vacuum pump, usually two stage with an in-line desiccant or moisture vapor trap of some type, may be substituted for the water seal vacuum pump.

Liquid Cleansing Area (2000)

This second area is composed of reference numerals (4') through (23') in FIG. 2. An insulated evaporator chamber (4') is flanked on one side by an insulated and refrigerated heat exchanger (cold) (17') and on the other side by an insulated degassification chamber (22'). Insulated evaporator chamber (4'), shown as capsular in shape, is in fluid communication with both as disclosed below.

Insulated vapor collection piping (16') extends between the tops of insulated evaporator chamber (4') and insulated and refrigerated heat exchanger (cold) (17'). Piping extends between the base of insulated degassification chamber (22') and the lower portion of insulated evaporator chamber (4'). Valve (23') controls the flow in that piping and is situated on that piping.

Insulated degassification chamber (22') is capsular in shape. Refrigerated heat exchanger (cold) (17') is tubular in shape and is surrounded by refrigeration coils whose sole purpose is to exchange heat. The coils may as well be placed in the walls of or inside of the body of heat exchanger (cold) (17').

The base of insulated and refrigerated heat exchanger (cold) (17') is connected through a U-shaped trap known in the art and more accurately described herein as an insulated distillate liquid trap (19'), to vacuum piping (3'). Insulated liquid trap (19') is essentially the same as the trap of the previous embodiment and of the embodiment that follows. Insulated degassification chamber (22') is in direct communication through a vacuum control valve and piping with vacuum piping (3') emanating from the top of insulated degassification chamber (22') and connecting to the Vacuum Generating Section (1000) in order to provide initial degassification of dissolved gasses from the glycol solution contained within insulated degassification chamber (22') as discussed below.

Refrigerant condenser coils (hot) (9') are located in the base area of insulated evaporator chamber (4') in FIG. 2, but could as well be wrapped around the outside of the lower portion of insulated evaporator chamber (4') to transfer the same heat effect to the liquid that is to be contained therein. Refrigerant condenser coils (hot) (9') are connected by tubing at one end to a supplemental refrigerant heat exchanger (8') with fan or other cooling means and a refrigeration heat pump (7') the latter two of which are located outside of Insulated evaporator chamber (4'). Although supplemental refrigerant heat exchanger (8') is shown generally below insulated and refrigerated heat exchanger (cold) (17'), it does not need to be in that location.

Refrigeration heat pump (7') is connected by tubing to the top of the refrigeration coils that make up a part of refrigerated heat exchanger (cold) (17'). At an opposite end, the refrigeration coils that make up a part of insulated and refrigerated heat exchanger (cold) (17') are connected through refrigeration expansion valve (18') to refrigerant condenser coils (hot) (9'). In this way, the typical closed cycle of a heat/coolant system is used to advantage to produce heat in insulated evaporator chamber (4') and to remove heat in insulated and refrigerated heat exchanger (cold) (17'). That is, the heated medium passing through the refrigeration coils of insulated and refrigerated heat exchanger (cold) (17') passes through refrigerant condenser coils (hot) (9') to heat liquid in the base of insulated evaporator chamber (4'). The heated medium then passes into refrigerant heat exchanger (8') where it is cooled and recycled back into the top of the refrigeration coils of refrigerated heat exchanger (cold) (17').

Above the connection between insulated degassification chamber (22') and insulated evaporator chamber (4') and extending transversely across the inside of insulated evaporator chamber (4') generally at its mid point, is demister pad or demister pads (5'). These pads or this pad (5') is generally identical to that described in the first embodiment herein. Demister pad or demister pads (5') is vapor permeable and has the same circumference and diameter as the inside mid section of insulated evaporator chamber (4'). Thus at the mid section of insulated evaporator chamber (4'), demister pad or demister pads (5') form a vapor permeable layer inside insulated evaporator chamber (4') above refrigerant condenser coils (hot) (9'). Below demister pads or demister pad (5') but above refrigerant condenser coils (hot) (9') is a supplemental heating electrode (6').

Supplemental heating electrode (6') facilitates and supplements the more exact control of the fluid temperature in the lower portion of insulated evaporator chamber (4').

Supplemental heating electrode (6') extends from the inside of insulated evaporator chamber (4') to its outside and rests within a well in the insulated evaporator chamber (4') that is not shown.

Solution make-up regulating valve (23') placed between the connection of degassification chamber (22') and insulated evaporator chamber (4'), regulates the flow of solution from degassification chamber (22') to insulated evaporator chamber (4'). In so doing, it maintains a proper solution level in insulated evaporator chamber (4'). That level is just below demister pad or demister pads (5') and covering refrigerant condenser coils (hot) (9') and heating electrode (6').

Below insulated evaporator chamber (4') is a closed insulated fluid collection tank (10'). The top of this insulated fluid collection tank (10') is fluidly connected through collection tank inlet valve (13') to the base of insulated evaporator chamber (4'). Through another connection at its top, Insulated fluid collection tank (10') is connected by a vent valve at (14') to the atmosphere and by a vacuum valve at (14') to vacuum piping (3'). At the base of insulated fluid collection tank (10') is collection tank drain valve (11'). The base of insulated fluid collection tank (10') may be opened by collection tank drain valve (11') to drain out the contents in the insulated fluid collection tank (10') through discharge piping (12') when the vent valve at (14') opens as described in greater detail below.

Glycol and water solution from a glycol and water solution tank (GH$_2$O) is transmitted to the upper portion of insulated degassification chamber (22') by solution feed pump with inlet filter/strainer (20'). Solution feed pump with inlet filter/strainer (20') transfers the glycol and water solution through piping extending from the glycol and water solution tank (GH$_2$O) to the top area of insulated degassification chamber (22') by means of solution regulating valve (21'). Solution regulating valve (21') opens to allow a proper solution level to be maintained in insulated degassification chamber (22'). The proper solution level is approximately 75 percent full so that there is only a small area at the top for degassification which is caused by the vacuum connection of insulated degassification chamber (22') to vacuum piping (3').

The solution passing through insulated degassification chamber (22') enters at a rate controlled by valve (23') into insulated evaporator chamber (4'). The fluid enters below demister pad or demister pads (5') but above supplementals electrode (6') and refrigerant condenser coils (hot) (9'). Here, it is heated by means of refrigerant condenser coils (hot) (9') and supplemental heating electrode (6'). Through this heating, the water in the solution vaporizes and separates from the glycol, the glycol being left in liquid form. The water vapor passes through demister pad or demister pads (5') while the glycol concentrates and drops into insulated fluid collection tank (10') by means of collection tank inlet valve (13'). When a specific gravity or specific conductance sensor (not shown) associated with insulated fluid collection tank (10') indicates to a computer hooked to the system of FIG. 2 but not shown, that the concentration in insulated fluid collection tank (10') is proper the following occurs. Collection tank inlet valve (13') closes, the vacuum valve at (14') remains closed, collection tank drain valve (11') opens and the vent valve at (14') opens to the atmosphere to allow the glycol to drain into glycol discharge piping (12'). When all of the glycol has drained from tank (10'), collection tank drain valve (11') closes, collection tank inlet valve (13') remains closed, the vent valve at (14') closes, and the vacuum valve at (14') opens to evacuate insulated fluid collection tank (10') of air. When insulated fluid collection tank (10') has returned to a vacuum pressure, the vacuum valve at (14') closes, and collection tank inlet valve (13') slowly opens and allows the liquid at the lower portion of insulated evaporator chamber (4') to enter insulated fluid collection tank (10'). This liquid will again be displaced by concentrated glycol and the process-repeats itself. The entire collection area can be replaced by a peristaltic pump and tank assembly in which the computer control system operates the peristaltic pump to empty the tank whenever the proper specific gravity or specific conductance level for glycol is reached.

The vaporized water in insulated evaporator chamber (4') passes through the demister pad or demister pads (5') and fills vapor expansion area (15') in the top half of insulated evaporator chamber (4'). From here it is pulled toward the insulated and refrigerated heat exchanger (cold) (17') due to the vacuum pressure and cooler condensing temperatures therein. In the insulated and refrigerated heat exchanger (cold) (17') the vapor gives up its heat and condenses into a liquid and collects in the insulated distillate liquid trap (19') below the insulated and refrigerated heat exchanger (cold) (17').

Different configurations of this embodiment are possible and particularly in large applications the following possibility amongst many might be considered. Insulated and refrigerated heat exchanger (cold) (17') could be situated below insulated evaporator chamber (4'). This would be similar to that shown in FIG. 1 with connections to the upper and lower portion of evaporator chamber (4') being modified to match that shown in FIG. 1 with respect to Insulated evaporator chamber (21). Further other heating and cooling sources and means can be used in lieu of the heat pump to accomplish the same purposes.

End Collection Zone (3000)

This area of FIG. 2 is composed of reference numerals (24') through (28') and is located between the Vacuum Generation Zone (1000) and the Liquid Cleansing Zone (2000). Its design and operation is essentially the same as that described with respect to the previous embodiment. Again, end collection zone (3000) is comprised of at least two closed insulated distillate collection tanks (26'). These tanks are each in fluid communication through a water inlet control valve (24') at their top ends with vacuum piping (3') and insulated distillate liquid trap (19'). Also at their top ends they are connected by vacuum and vent control valves at (25') either to the atmosphere or to vacuum piping (3'). The base of each insulated distillate collection tank (26') is connected by means of one collection tank drain valve (27') to discharge piping (28').

The water from insulated distillate liquid trap (19') flows through the piping connecting it to vacuum piping (3') and insulated distillate collection tanks (26'). From here it flows toward the two or more insulated distillate collection tanks (26'). This is due to the vacuum transmitted through vacuum piping (3'). The water exiting insulated distillate liquid trap (19') does not revaporize because the computer control system selects the vacuum level at vacuum piping (3') which corresponds to the latent heat of vaporization point for water which corresponds to a higher temperature than the temperature of water exiting insulated distillate liquid trap (19'). The insulated distillate collection tanks (26') are subjected to vacuum from vacuum piping (3') when water inlet valve (24') is open, collection tank drain valve (27') is closed, and vacuum and vent valves at (25') are closed. The insulated distillate collection tanks (26') are at the same vacuum level as that of vacuum piping (3').

Water flows from the insulated distillate liquid trap (19') into the first insulated distillate collection tank (26') through open water inlet control valve (24'). When the first of the insulated distillate collection tanks (26') is filled with water, water inlet control valve (24') to that insulated distillate collection tank (26') closes, collection tank drain valve (27') to that tank opens, vacuum valve at (25') to that tank remains closed, and vent valve at (25') for that tank opens and the distillate Inside the tank drains to the discharge piping (28'). As soon as that insulated distillate collection tank (26') is empty of fluid, the vent valve at (25') closes, water inlet control valve (24') remains closed, collection tank drain valve (27') closes, and the vacuum valve at (25') opens to evacuate all air from the freshly emptied insulated distillate collection tank (26'). Once the insulated distillate collection tank (26') is evacuated, the vacuum valve at (25') closes, and water inlet control valve (24') is opened to allow the distillate to be once again collected in the insulated distillate collection tank (26').

The insulated distillate collection tanks (26') alternately drain and fill so that a continuous flow of water through the Insulated distillate liquid trap (19') occurs. The insulated distillate collection tanks (26') are insulated to isolate them from ambient temperatures, and the piping from the insulated distillate liquid trap (19') to the insulated distillate collection tanks (26') is also insulated.

The elements described in this area could be replaced by a known rotating vane device or peristaltic pump and tank as described in the previous embodiment.

The discussion with respect to the second embodiment herein has been directed to the separation of water from glycol. Again, it is to be understood that other liquids, fluids or solutions are contemplated including human and animal bodily fluids. If one is to use the second embodiment in the treatment or cleansing of blood such as plasma pheresis, certain modifications are understood to be made. Solution feed pump with inlet filter/strainer (20') may be replaced by intravenous tubing connected at solution regulating valve (21') and then to a donor or typical blood collection container or used in conjunction with other blood processing equipment which separates out red blood cells from plasma. Blood distillates collected at insulated distillate collection tank (26') would not be exposed to atmosphere at the vent valve at (25') nor would they be discharged into piping as shown at (28'). Instead, blood distillates would be collected at insulated distillate collection tank (26') in a suitable detachable container approved for medical purposes which would allow the distillate to remain sterile and under a vacuum condition. This vacuum distillate in the detached container (26') could be tested, supplemented, and reinjected into a donor or stored for future use. Blood concentrates (salts, residues, etc.) collected at tank (10') may be stored for later recombination with the distillate or otherwise, may be reused, may be tested and screened, or may be disposed of all as desired by the user.

Tank (10') may also be replaced by a rotating vane device or peristaltic pump and tank assembly. The computer control system which controls the emptying of tank (10')) can respond to either specific conductance or specific gravity.

The purpose of this embodiment is to separate certain specific fluids in solution using low temperatures and vacuum. Examples for its use are the separation of water from glycol solutions, ethylene and propylene glycol from glycol/sludge/additives solutions, and metals finishing industry solutions which require separation of one fluid from a solution, or purification of a certain fluid by separation of solids in solution with it. The computer control system used would allow the selection of various fluids based upon their specific gravity and vaporization points under vacuum conditions. Such systems are known in the art. The vacuum pressure used In this embodiment is selected to correspond to the vaporization point of the particular fluid which will be removed first from the process.

Figure 3:
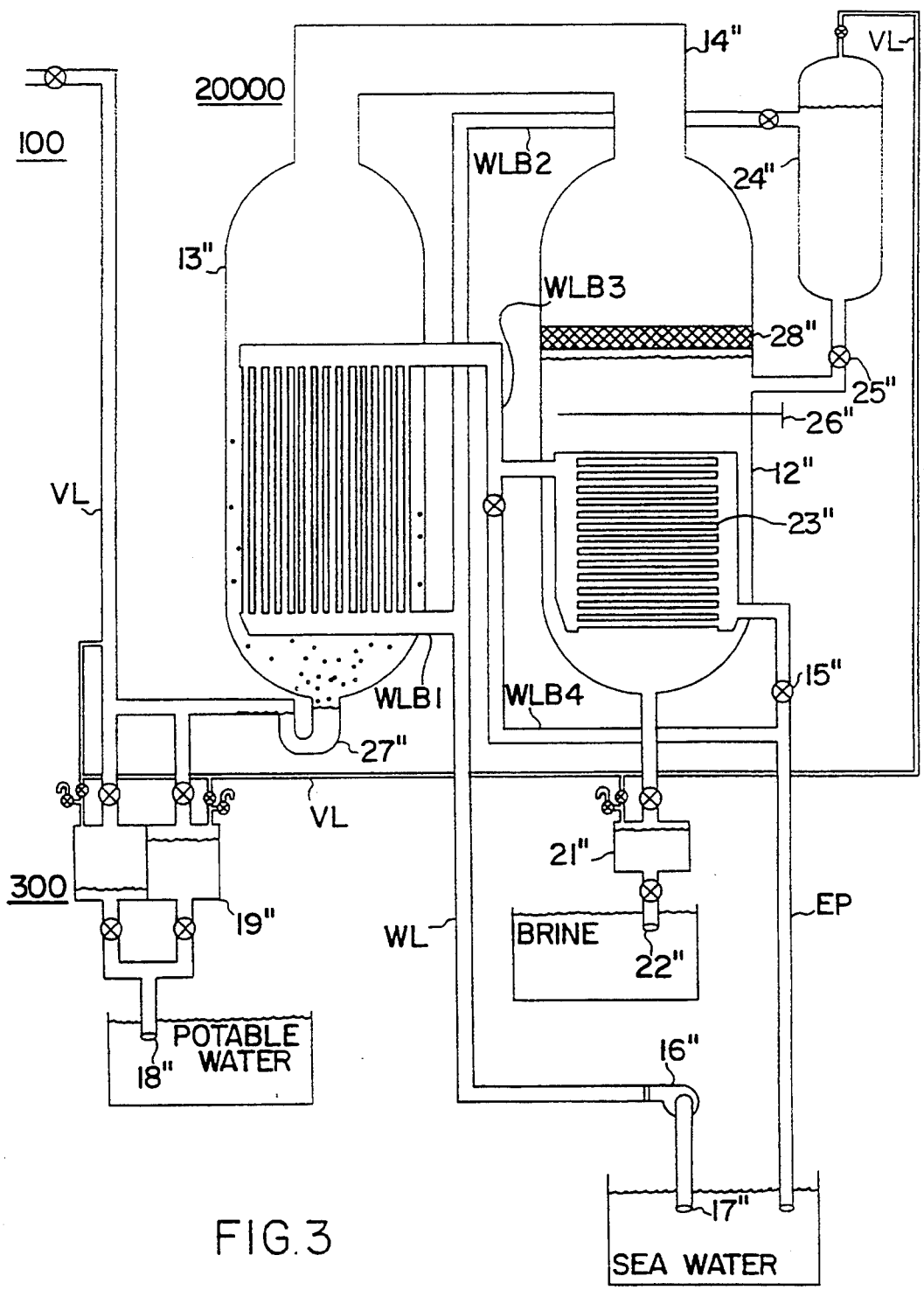
FIG. 3 is a diagrammatic view of a third embodiment of the invention.

FIG. 3 is the third embodiment of this invention. It too is comprised of three areas of study, the Vacuum Generating Section (100), the Liquid Cleansing Area (20,000), and the End Collection Zone (300). The Vacuum Generating Section (100) and the End Collection Zone (300) are identical to that shown in FIG. 1 and therefore no further discussion of these areas is made. Again Vacuum Generating Section (100) may be replaced by a known vacuum system and the End Collection Zone (300) may be replaced by a known peristaltic pump and tank assembly or by a rotating vane device. The first embodiment herein is most closely related with this last third embodiment and both operate very similarly. Reference to the operation of the first embodiment will be of use in understanding this third embodiment.

Liquid Cleansing Area (20,000)

The liquid cleansing area of this embodiment is comprised of reference numerals (12") through (17") and reference numerals (21") through (27").

Liquid, seawater, contaminated water, or water from a large body of water (17") is transported by means of pump (16") through water line (WL). Pump (16") is connected to water line (WL). Water line (WL) extends from (17") to a first branch (WLB1) and a second branch (WLB2). Water line branch one (WLB1) extends into an insulated heat exchanger (13"). Water line branch two (WLB2) extends into an insulated degassification tank (24") which is discussed more fully in later paragraphs. Insulated heat exchanger (13") is capsular in shape. Extending around the internal middle and lower portion of insulated heat exchanger (13") are a plurality of tubes which communicate with each other and water line branch one (WLB1) in a traditional heat exchanger configuration well known to those skilled in the art. Liquid from (17") is pumped by means of pump (16") through water line (WL) and water line branch one (WLB1) into and through the tubes in insulated heat exchanger (13").

The bottom of insulated heat exchanger (13") opens into an insulated pipe which leads into a U shaped trap (27"). Trap (27") is also insulated and continues into an insulated pipe that leads into End Collection Zone (300). Trap (27") and its immediate connections are identical to those disclosed in FIG. 1.

The liquid in water line branch one (WLB1) passes into and through the tubes in insulated heat exchanger (13") and exits insulated heat exchanger (13") at a water line branch three (WLB3). Water line branch three (WLB3) is surrounded by insulation and has two ends and one valved branch Connection, water line branch four (WLB4). One of the two ends connects to the top side of the tubes in insulated heat exchanger (13"). This connection is opposite to and above the connection of water line branch one (WLB1) with the tubes In heat exchanger (13"). The other of the two ends connects at the lower half of an insulated boiler chamber (12") to heat reclaim coils (23") both to be discussed in the following paragraphs. This connection of water line branch three (WLB3) causes the first end of water line branch three (WLB3) to be located at a higher level than the second end of water line branch three (WLB3). Water line branch four (WLB4) is a bypass pipe and valve which is computer controlled according to the temperature of the fluid in water line branch three (WLB3). It is connected between water line branch three (WLB3) and exit pipe (EP) which is also discussed in the following paragraphs.

Situated near insulated heat exchanger (13") and of similar shape, is insulated boiler chamber (12"). Boiler chamber (12") is connected at its top end by means of insulated vapor collection piping (14") to the top end of insulated heat exchanger (13"). Situated around the lower mid section of insulated boiler chamber (12") are heat reclaim coils (23") which connect at their top side to water line branch three (WLB3). Above heat reclaim coils (23") and within insulated boiler chamber (12") is heating electrode (26") which heats the liquid contained in insulated boiler chamber (12"). Heating electrode (26") is typically powered by an external electrical power source, or may be a supplemental hot water exchanger supplied with heat from a cooling tower or similar source as described in the first embodiment. The purpose of the electrode or heat source (26") is simply to heat and maintain the water in the boiler chamber (12") at the correct temperatures, and this heat may come from a variety of sources. As noted in the first embodiment, the vacuum level is first established at the proper level prior to introduction of heat. In certain installations (not shown) in which the boiler chamber (12") and heat exchanger (13") are relocated to 42 to 50 feet in overall height in similar fashion as described below, the heating electrode may be supplementally powered by electrical power hydraulically recovered from the water exiting at exit pipe (EP). Such hydraulic recovery is well known to those skilled in the art.

Demister pads (28") are located in the top upper portion of insulated boiler chamber (12") above heat electrode (26"). They are dimensioned and perform the function as described in previous embodiments.

Liquid exiting water line branch three (WLB3) enters and flows through heat reclaim coils (23"). Connected to the lower portion of heat reclaim coils (23") at that side opposite water line branch three (WLB3) is water regulating valve (15") and exit piping (EP). Exit piping (EP) connects with bypass water line (WLB4) below valve (15") and then extends into the original body of liquid, which may be seawater (17"). The liquid passing through heat reclaim coils (23") exits through computer controlled water regulating valve (15") into exit piping (EP) and is returned to the original body of liquid which may be seawater (17"). In certain installations, hydraulic recovery of the pumping forces supplied by pump (16") and exiting through exit pipe (EP) will be achieved by relocating (not shown) the height of boiler chamber (12"), degassification chamber (24"), cross duct or vapor collection piping (14"), and insulated heat exchanger (13") to a position 42 to 50 feet above ground. This is done by lengthening connecting piping water line (WL), exit pipe (EP) and piping leading to trap (27") and tank (21"). The purpose will be to recover the forces from the liquid exiting at exit pipe (EP) before that liquid returns to the original body of liquid and to use this recovered hydraulic power to reduce pumping or electrical requirements in the same fashion as in the first embodiment described herein.

As noted earlier, a portion of the seawater or unfit liquid brought from body (17") is diverted into water line branch two (WLB2). This branch circumvents insulated heat exchanger (13") and passes into insulated capsular degassification chamber (24"). Water line branch two (WLB2) could as well branch from water line branch three (WLB3) or exit pipe (EP). The purpose of water line branch two (WLB2) is to provide make-up liquid to degassification chamber (24"). Degassification chamber (24") is in fluid communication with insulated boiler chamber (12") by means of insulated piping and valve (25") and it is located to the side of insulated boiler chamber (12") near exit pipe (EP). The connection of degassification chamber (24") to insulated boiler chamber (12") is above the connection of exit pipe (EP) and water regulating valve (15") and below demister pad (28") but above heat reclaim coils (23") and heating electrode (26"). At its top end, degassification chamber (24") is in direct fluid communication with vacuum line (VL) having its origins in Vacuum Generating Section (100). In use, seawater or unfit liquid passing through water line branch two (WLB2) into degassification chamber (24") is subject to vacuum pressure to remove dissolved gasses.

The seawater or unfit liquid passes through degassification chamber (24") and regulating valve (25") into boiler chamber (12") and there is exposed to electrode (26") and heat reclaim coils (23"). Valve (25") serves to regulate makeup fluid level within boiler chamber (12") and to maintain that fluid level at the proper operating level below demister pad (28") and covering electrode (26") and heat reclaim coil (23"). In view of this exposure, at least a portion of the liquid bolls. The vapor from the boiling liquid passes through demister pad or pads (28") into vapor collection piping (14") and from there into insulated heat exchanger (13"). Meanwhile, residue in the liquid brought into insulated boiler chamber (12") from degassification chamber (24") is separated means of the boiling action in boiler chamber (12") and falls to the bottom of insulated boiler chamber (12").

The base of insulated boiler chamber (12") is connected by means of a closable valve to a closed brine tank (21"). Brine tank (21") is in turn connected at its base through a valve to an open brine collection tank (22"). Insulated boiler chamber (12") and brine collection tanks (21") and (22") are connected together in with insulated boiler chamber (12") being above and in line with brine tank and brine collection tank (21" and 22"). Although brine tank (21") is a closed unit, through its top it is in valved fluid communication with vacuum line (VL) as well as boiler chamber (12"). The vacuum connection facilitates the collection of brine from insulted boiler tank (12").

In view of the connection of Insulated boiler chamber (12") to brine tank (21"), the salt residues and other contaminants from the seawater (17") that settle in the bottom of boiler chamber (12"), pass into brine tank (21"). These residues are allowed to settle as a concentrated brine solution and displace the seawater contained in brine tank (21") until the outside computer controls note that a total dissolved solids, specific gravity, or conductivity level is reached. At this time, the brine is drained into tank (22"). The valve between insulated boiler chamber (12") and brine tank (21") closes off to maintain vacuum in the chamber (12") while the brine is drained from brine tank (21") to brine collection tank (22"). The drain between the two tanks (21", 22") then closes and the vacuum valve opens momentarily to evacuate air from brine tank (21"). This valve then closes and the valve between brine tank (21") and insulated boiler chamber (12") slowly reopens to allow brine to once again collect in brine tank (21"). Valve (25") operates to allow water from the insulated degassification tank (24") to enter insulated boiler chamber (12") to compensate for the refilling of brine collection tank (22"). Degassification chamber (24") is sized to be of larger capacity than brine collection tank (22"). Tanks (21" and 22") may be replaced by a rotating vane device or a peristaltic pump and tank assembly. The computer control which controls the emptying of the tank (21") can respond to either specific conductance or specific gravity.

The vapor passing through piping (14") enters insulated heat exchanger (13") and passes over the tubes therein carrying liquid from water line branch one (WLB1). The vapor is thereby cooled and condenses as it passes over the tubes in insulated heat exchanger (13"). Simultaneously, the liquid passing through the tubes in insulated heat exchanger (13") is heated by the vapor passing over the tubes. Once the vapor condenses, it drains out of the base of insulated heat exchanger (13") into trap (27). From there it proceeds to End Collection Zone (300) as described in the preceding figures.

Vacuum level inside the invention is computer maintained to correspond to a temperature for vaporization of liquid under vacuum that is warmer than the incoming liquid being supplied to it. As one example, 60 degrees fahrenheit seawater to the device will require boiler chamber (12") to be at a temperature of approximately 70 degrees fahrenheit in order to maintain full process capabilities. The vacuum level will have been initially established at 29.25 inches Hg so that the water exiting trap (27") does not revaporize. This device can operate under a broad range of temperatures for the seawater or other liquid being supplied to it. The test is that the incoming heat source (26") in conjunction with the heat recovery source at (23") must adequately elevate the liquid in boiler chamber (12") to vapor under vacuum conditions.

As stated above, the boiler chamber (12") is provided with vacuum transmitted through vapor collection pipes (14"). The heating element or heating source (23") is thermostatically controlled to provide enough heat to elevate the liquid within the boiler chamber (12") to vapor. At vacuum levels of operation, approximately 1100 btu/Ib-m is required to vaporize water.

The foregoing description is only one example of the manner of accomplishing the invention. Obvious modifications are within the contemplation of the inventor. One modification is changing the floating head heat exchanger for a direct heat exchanger, or changing the configurations of the boiler chamber, evaporator, and heat exchanger.

In this embodiment and the previous embodiments, fluids, heat, and energy are by means of closed exchange systems continuously recycled to maximize efficiency, reduce costs in construction and usage, and diminish impact on the environment.

The present invention is claimed as follows:

1. A method for distilling and purifying a fluid comprised of:
   bringing the fluid to be distilled and purified into a vacuum pressured distillation and purifying system;
   subjecting said fluid to heat and vacuum pressure by means of heating means and vacuum means to cause said fluid to separate into vapor and non vaporized matter;
   removing said non vaporized matter from said distillation and purifying system;
   passing said vapor over heat exchange coils to cause said vapor to condense into distillate;
   collecting said distillate through a trap into a collection means;
   such that when said trap fills with said distillate, the vacuum requirement of said system diminishes, said vacuum means generating a vacuum pressure that is controlled such that the latent heat of vaporization point under vacuum pressure corresponds to a temperature greater than the temperature of said distillate in said trap so that said distillate in said trap remains in a condensed state and does not vaporize, said vacuum being effectively applied only to said distillate in said trap once said trap is filled with said fluid, activating said heating means only after the vacuum level in said system corresponds to a latent heat of vaporization point which represents a set relationship with respect to the temperature of the fluid to be distilled and purified.

2. The method of claim 1 further comprising the step of placing said distillation and purifying system to enable hydraulic recovery to reduce pumping and power consumption and constructing said system for heat recovery and reuse.

3. The method of claim 1 wherein said vacuum means is comprised of: at least two atmospherically closed towers; a vented tank connected to said towers; a pump connected between said vented tank and said towers; and valves associated with said towers whereby said vacuum pressure in said subjecting step is created by pumping, by means of said pump, oil from said tank to one of said at least two towers until a certain level is reached in one of said two towers; further pumping by means of said pump oil into the second of said two towers while the oil in said one of said towers drains back into said tank to form said vacuum pressure in said one tower; transmitting said vacuum pressure through one of said valves to said system, said towers continually filling and draining in alternating fashion to create the vacuum pressure for said system.

4. The method of claim 3 wherein said oil is one of polyalpholefin or synthetic oil and is at ambient temperature in said tank and in said towers.

5. The method of claim 3 wherein said oil fills each tower to a level corresponding to one atmosphere of pressure before being drained from said towers.

6. A method for distilling and purifying a fluid comprised of:
   bringing the fluid to be distilled and purified into a vacuum pressured distillation and purifying system;
   subjecting said fluid to heat and vacuum pressure by means of heating means and vacuum means to cause said fluid to separate into vapor and non vaporized matter;
   removing said non vaporized matter from said distillation and purifying system;
   passing said vapor over heat exchange coils to cause said vapor to condense into distillate;
   collecting said distillate through a trap into a collection means, said collection means being comprised of at least two closed tanks with valves directly connecting said tanks to said trap and said vacuum means and also directly connecting said tanks to atmosphere and to a collection conduit open to atmosphere, wherein said distillate from said trap flows toward said at least two closed tanks to be alternately collected and drained from each tank in a piston arrangement so that a continual flow of distillate from said trap into said collection means occurs, whereby when one tank if full the valve to said trap closes and the valve to atmosphere opens to enable the draining of said tank until said tank is drained, then said valve to atmosphere closes and said valve to said vacuum opens until said tank is pressurized at which time said valve to said vacuum closes and said valve to said trap opens to again enable said tank to fill with distillate wherein when said trap fills with said distillate, the vacuum requirement of said system diminishes, said vacuum means generating a vacuum pressure that is controlled such that the latent heat of vaporization point under vacuum pressure corresponds to a temperature greater than the temperature of said distillate in said trap so that said distillate in said trap remains in a condensed state and does not vaporize, said vacuum being effectively applied only to said distillate in said trap once said trap is filled with said fluid.

7. The method of claim 1 further comprising the step of degassing said fluid by use of said vacuum means before causing said fluid to be vaporized in said subjecting step.

8. A method for distilling and purifying a fluid comprised of:
bringing the fluid to be distilled and purified into a vacuum pressured distillation and purifying system;
subjecting said fluid to heat and vacuum pressure by means of heating means and vacuum means to cause said fluid to separate into vapor and non vaporized matter;
removing said non vaporized matter from said distillation and purifying system;
passing said vapor over heat exchange coils to cause said vapor to condense into distillate;
collecting said distillate through a trap into a collection means; and
collecting said non vaporized matter from the base of said distillation and purifying system, wherein said non vaporized matter is collected in a closed and insulated tank, said insulated tank comprising valves and being connected through said valves to (1) an area in said distillation and purifying system where said fluid is vaporized, (2) the atmosphere, and (3) said vacuum pressure from said vacuum means, whereby when the concentration in said area where said fluid is vaporized is at a certain level, said valve to said area where said fluid is vaporized is opened to allow said non vaporized materials to drain into said tank, and upon completion of said draining, said valve to said area where said fluid is vaporized closes and said valve to the atmosphere opens so that said non vaporized materials are drained from said tank, wherein when said tank is drained said valve to the atmosphere is closed, said valve to said vacuum means is opened to return said tank to vacuum pressure at which time said valve to said vacuum means is closed and said tank is again ready to receive non vaporized materials, such that when said trap fills with said distillate, the vacuum requirement of said system diminishes, said vacuum means generating a vacuum pressure that is controlled such that the latent heat of vaporization point under vacuum pressure corresponds to a temperature greater than the temperature of said distillate in said trap so that said distillate in said trap remains in a condensed state and does not vaporize, said vacuum being effectively applied only to said distillate in said trap once said trap is filled with said fluid.

9. The method of claim 1 wherein (1) said distillation and purifying system has a bottom, said trap being connected to said bottom so that vapor condensed into distillate in said distillation and purifying system is facilitated by gravity to flow into said trap; (2) said distillation and purifying system is located at such a height that assisted by gravity said fluid is able to enter said distillation and purifying system and drain as distillate from said distillation and purifying system; and (3) the vacuum pressure is selected to correspond to the vaporization point of the fluid to be distilled.

10. The method of claim 1 wherein in said distillation and purifying system there is an area where said fluid is vaporized and the non vaporized materials separated therefrom, said area being located at a height such that said nonvaporized materials drain by gravitational force and weight.

11. The method of claim 1 further comprising the steps of venting and draining of distillate and nonvaporized materials, wherein the vacuum level is maintained to correspond to a temperature for vaporization of fluid under vacuum that is warmer than incoming fluid to be distilled and wherein all venting and draining of distillate and nonvaporized materials is accomplished in a fashion so as not to diminish the vacuum levels inside the device.

12. A method for distilling and purifying a fluid comprised of:
bringing the fluid to be distilled and purified into a vacuum pressured distillation and purifying system;
subjecting said fluid to heat and vacuum pressure by means of heating means and vacuum means to cause said fluid to separate into vapor and non vaporized matter;
removing said non vaporized matter from said distillation and purifying system;
passing said vapor over heat exchange coils to cause said vapor to condense into distillate;
collecting said distillate through a trap into a collection means;
such that when said trap fills with said distillate, the vacuum requirement of said system diminishes, said vacuum means generating a vacuum pressure that is controlled such that the latent heat of vaporization point under vacuum pressure corresponds to a temperature greater than the temperature of said distillate in said trap so that said distillate in said trap remains in a condensed state and does not vaporize, said vacuum pressure being effectively applied only to said distillate in said trap once said trap is filled with said distillate, said trap acting as a pressure head as it fills with said distillate thereby reducing the effective vacuum requirement of said system, said vacuum means acting merely on the surface area of said distillate in said trap while the vacuum level initially established in said distillation and purifying system where said fluid is vaporized and condensed fluctuates to create a pressure differential between where said vacuum is generated and the inside of a vaporizing and condensing area, said pressure differential facilitating the flow of said distillate through said trap and reducing the overall demand for vacuum from said vacuum means.

* * * * *